(12) United States Patent
Whitman et al.

US010805402B1

(10) Patent No.: US 10,805,402 B1
(45) Date of Patent: Oct. 13, 2020

(54) AUTOMATED LOCATION VERIFICATION

(71) Applicant: INTERNATIONAL BUSINESS MACHINES CORPORATION, Armonk, NY (US)

(72) Inventors: Todd Russell Whitman, Bethany, CT (US); Jeremy R. Fox, Georgetown, TX (US); Andrew R. Jones, Round Rock, TX (US); John Monnett, Southbury, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/539,197

(22) Filed: Aug. 13, 2019

(51) Int. Cl.
*H04L 29/08* (2006.01)
*G06F 16/22* (2019.01)
*G06Q 10/08* (2012.01)
*H04W 12/00* (2009.01)
*H04L 29/06* (2006.01)

(52) U.S. Cl.
CPC ............ *H04L 67/125* (2013.01); *G06F 16/22* (2019.01); *G06Q 10/0833* (2013.01); *H04L 63/04* (2013.01); *H04W 12/001* (2019.01)

(58) Field of Classification Search
CPC .... H04L 67/125; H04L 63/04; H04W 12/001; G06F 16/22; G06Q 10/0833
USPC ...................................................... 455/456.1
See application file for complete search history.

(56) References Cited

U.S. PATENT DOCUMENTS

| 7,992,777 | B1* | 8/2011 | Block .................... G06Q 20/18 235/379 |
| 9,473,510 | B2 | 10/2016 | Pearce |
| 9,668,100 | B2 | 5/2017 | Allen |
| 9,721,250 | B2* | 8/2017 | Hammad ............. G06Q 10/087 |
| 10,171,933 | B2 | 1/2019 | Allen |
| 2006/0091206 | A1* | 5/2006 | Olsen ..................... G06Q 10/08 235/384 |
| 2011/0109508 | A1* | 5/2011 | Wolman ................ H04W 12/00 342/451 |
| 2013/0297416 | A1* | 11/2013 | Dipaola .................. H04L 63/08 705/14.53 |
| 2013/0311265 | A1* | 11/2013 | Prothero .............. G06Q 20/387 705/14.26 |

(Continued)

FOREIGN PATENT DOCUMENTS

WO 2016039882 A1 3/2016

OTHER PUBLICATIONS

5G-Challenges; https://www.tutorialspoint.com/5g/5g_challenges.htm#, retrieved from the Internet Mar. 26, 2019; 4 pages.

(Continued)

*Primary Examiner* — William Nealon
(74) *Attorney, Agent, or Firm* — Schmeiser, Olsen & Watts; Brian M. Restauro

(57) ABSTRACT

A method and system for verifying a location of an entity is provided. The method includes monitoring a request broadcast by an entity for verifying a first location of the entity. The request is detected as being received and verification data indicating that the entity has been located at the first location during a specified timeframe is received. A resulting acknowledgement is transmitted, and the verification data is stored in a database. A compensation indication associated with providing the verification data is transmitted to a device.

20 Claims, 7 Drawing Sheets

(56) References Cited

U.S. PATENT DOCUMENTS

| | | | |
|---|---|---|---|
| 2013/0324151 A1* | 12/2013 | Lee | H04W 24/00 455/456.1 |
| 2014/0329541 A1* | 11/2014 | Li | G01S 5/0252 455/456.1 |
| 2015/0282115 A1* | 10/2015 | Pitt | H04W 64/006 455/456.1 |
| 2016/0315921 A1 | 10/2016 | Dara | |
| 2017/0367067 A1 | 12/2017 | Hwang | |
| 2018/0343635 A1 | 11/2018 | Edge | |
| 2018/0365633 A1 | 12/2018 | Hanis | |
| 2018/0367314 A1 | 12/2018 | Egner | |
| 2018/0374075 A1* | 12/2018 | Tian | H04L 63/08 |
| 2019/0053010 A1 | 2/2019 | Edge | |
| 2019/0116486 A1 | 4/2019 | Kim | |

OTHER PUBLICATIONS

Best, Jo; The race to 5G: Inside the fight for the future of mobile as we know it; TechRepublic; Dec. 15, 2014; p. 21.

Cranz, Alex; The Future of Super-Fast 5G Internet Is a Mess; Gizmodo; Mar. 1, 2017; 8 pages.

Ekici, Eylem et al.; A Probabilistic Approach to Location Verification in Wireless Sensor Networks; 2006 IEEE International Conference on Communications; Jun. 11-15, 2006; 6 pages.

Goicochea, Elizabeth; Building Smart Cities through Location-Based Technology; Dec. 2, 2016; 9 pages.

Kim, In-hwan et al.; An Efficient Location Verification Scheme for Static Wireless Sensor Networks; Sensors (Basel), v.17(2); Feb. 2017; 32 pages.

Mini, Md Sipon et al.; Superallocation and Cluster-Based Cooperative Spectrum Sensing in 5G Cognitive Radio Network; Chapter 9—Towards 5G Wireless Networks—A Physical Layer Perspective; 2016; 23 pages.

Oreskovic, Alexei; Google tests waters for potential ultra-fast wireless service; Reuters.com, Technology News; Oct. 15, 2014; 9 pages.

* cited by examiner

AUTOMATED LOCATION VERIFICATION

BACKGROUND

The present invention relates generally to a method for verifying a location of an entity and in particular to a method and associated system for detecting entity locations and acknowledging specified locations and associated timeframes associated with the entity.

SUMMARY

A first aspect of the invention provides an automated verification method comprising: monitoring, by a computer processor of a hardware device, a request broadcast by an entity for verifying a first location of the entity; detecting, by the processor, that the request has been received by a first device located within a specified perimeter surrounding the entity; receiving, by the processor from the first device, verification data indicating that the entity has been located at the first location during a specified timeframe; transmitting, by the processor to the first device, an acknowledgement indicating that the verification data has been received; storing within a database, by the processor, the verification data; and transmitting, by the processor to the first device, a compensation indication associated with providing the verification data.

A second aspect of the invention provides a computer program product, comprising a computer readable hardware storage device storing a computer readable program code, the computer readable program code comprising an algorithm that when executed by a computer processor of a hardware device implements an automated verification method, the method comprising: monitoring, by the computer processor, a request broadcast by an entity for verifying a first location of the entity; detecting, by the processor, that the request has been received by a first device located within a specified perimeter surrounding the entity; receiving, by the processor from the first device, verification data indicating that the entity has been located at the first location during a specified timeframe; transmitting, by the processor to the first device, an acknowledgement indicating that the verification data has been received; storing within a database, by the processor, the verification data; and transmitting, by the processor to the first device, a compensation indication associated with providing the verification data.

A third aspect of the invention provides a hardware device comprising a computer processor coupled to a computer-readable memory unit, the memory unit comprising instructions that when executed by the computer processor executes an automated verification method comprising: monitoring, by the computer processor, a request broadcast by an entity for verifying a first location of the entity; detecting, by the processor, that the request has been received by a first device located within a specified perimeter surrounding the entity; receiving, by the processor from the first device, verification data indicating that the entity has been located at the first location during a specified timeframe; transmitting, by the processor to the first device, an acknowledgement indicating that the verification data has been received; storing within a database, by the processor, the verification data; and transmitting, by the processor to the first device, a compensation indication associated with providing the verification data.

The present invention advantageously provides a simple method and associated system capable of verifying a location of an entity.

DETAILED DESCRIPTION

Figure 1:
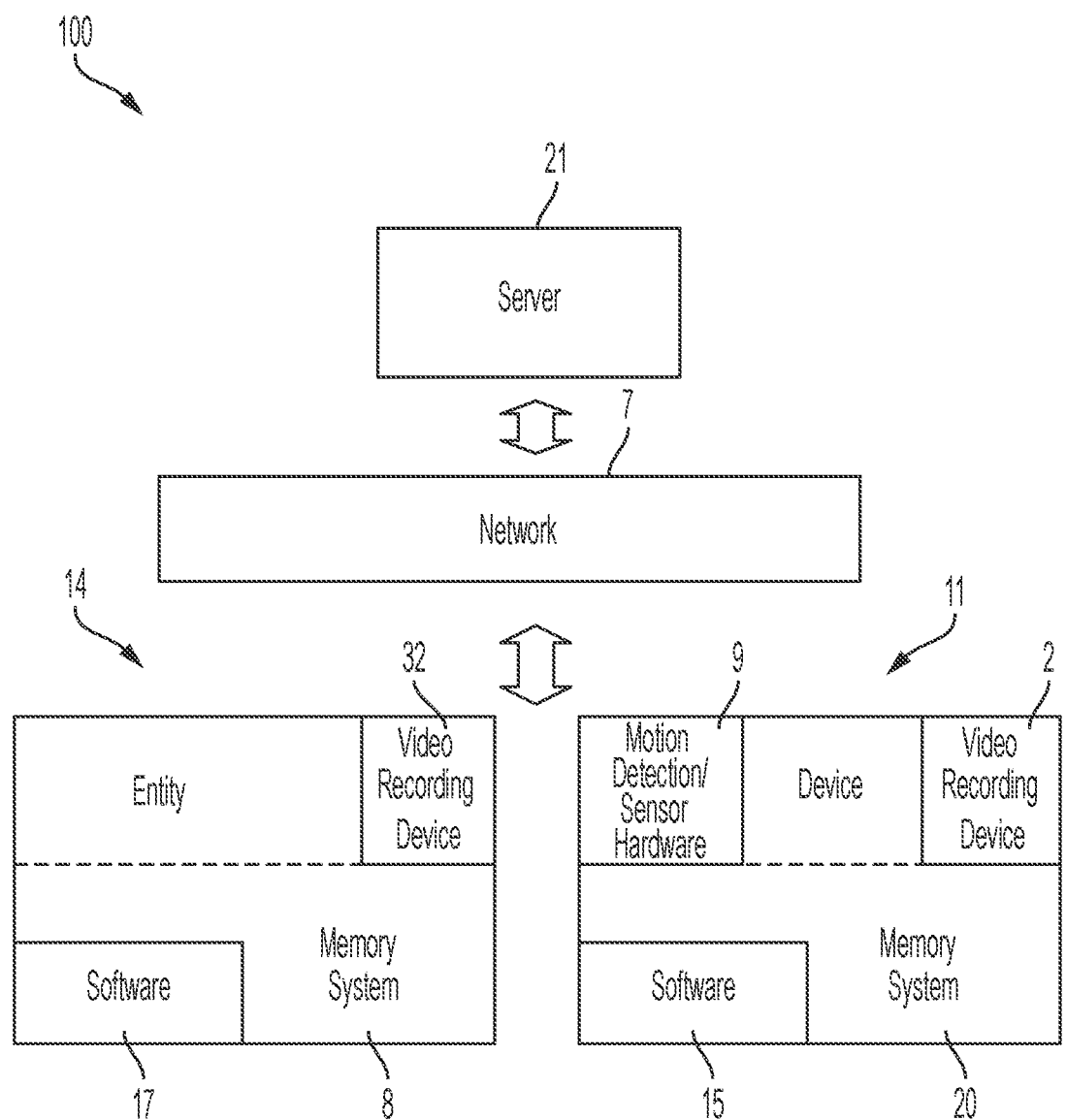
FIG. 1 illustrates a system for improving detection and verification technology by detecting entity locations and acknowledging specified locations and associated timeframes associated with the entity, in accordance with embodiments of the present invention

FIG. 1 illustrates a system 100 for improving detection and verification technology by detecting entity locations and acknowledging specified locations and associated timeframes associated with the entity, in accordance with embodiments of the present invention. Typical systems for verifying entity locations and associated timeframes include verification processes implemented via an independent 3rd party. Likewise, a typical verification system may require multiple location verification sources to verify that an entity (e.g., a vehicle) has been located at a specified location at a specified time for tracking and legal proof purposes. Therefore, system 100 enables a process for accessing collective social media and additional sources for providing proof of location services. The proof is recorded by a recording entity (i.e., a hardware system) acting as a broker between an entity providing the location verification service and an entity requiring a location verification. Multiple location verification providers may provide a higher level of confidence that the verification is legitimate.

System 100 is configured to identify a moving object (e.g., a vehicle) and transmit a communications protocol service that serves as a validation that the moving object has been verified at a specified location at a specified date, time, and within a specified frame of reference. The verification information may include differing types of information that are unique to the communication. Furthermore, the validation event may be recorded on an immutable record. Likewise (via utilization of blockchain), system 100 is enabled to illustrate that the moving object was located at the given location. An IoT service may be implemented for deriving value for any moving object that requires proof that it was detected at a physical location at a temporally fixed point in time.

System 100 enables an independent social, Ad-hoc, and decentralized/IoT based location verification request process for establishing a tracking of validation proof that a vehicle (e.g., an autonomous vehicle) has passed through a physical point of space and time with an immutable proof record of the event (e.g., subject matter, state of subject, etc.).

System 100 of FIG. 1 includes an entity 14, a device 11, and a server interconnected through a network. Entity 14 (i.e., including video recording device 32 and software 17), device 11 (i.e., including video recording device 2, motion detection/sensor hardware 9, and software 15), and server 21 each may comprise an embedded computer. An embedded computer is defined herein as a remotely portable dedicated computer comprising a combination of computer hardware and software (fixed in capability or programmable) specifically designed for executing a specialized function. Programmable embedded computers may comprise specialized programming interfaces. Additionally, entity 14 (i.e., including video recording device 32 and software 17), device 11 (i.e., including video recording device 2, motion detection/ sensor hardware 9, and software 15), and server 21 may each comprise a specialized hardware device comprising specialized (non-generic) hardware and circuitry (i.e., specialized discrete non-generic analog, digital, and logic-based circuitry) for executing a process described with respect to FIGS. 1-7. The specialized discrete non-generic analog, digital, and logic-based circuitry may include proprietary specially designed components (e.g., a specialized integrated circuit designed for only implementing an automated process for detecting entity locations and acknowledging/ verifying specified locations and associated timeframes associated with the entity). Entity 14 may include memory system 8, software 17, and a video recording device 32 (e.g., a video camera), software 17 to execute a process for detecting entity locations and acknowledging/verifying specified locations and associated timeframes associated with the entity. Device 11 (including video recording device 2, motion detection/sensor hardware 9, and software 15) is configured to execute a process for detecting entity locations and acknowledging/verifying specified locations and associated timeframes associated with the entity. Entity 14*n* may comprise a vehicle or a user requiring location verification. Entity 14 may comprise any type of vehicle that does not require a human operator to be located within the vehicle 14 such as, inter alia, a remote controlled vehicle (e.g., an aircraft flown by a pilot at a ground control station), an autonomously controlled vehicle (e.g., an aircraft controlled based on pre-programmed flight plans and may include an intelligence algorithm that would enable a vehicle to know it's location and self-determine a route to perform a function), a pre-programmed vehicle, etc. Alternatively, entity 14 may comprise any type of vehicle that includes a human operator located within the vehicle (e.g., an aircraft, an automobile, a boat or ship, a train, etc.). Entity 14 may include, inter alia, an aerial vehicle, a land-based vehicle, a marine (water) based vehicle, etc. Device 11 may include any type of device capable of verifying a location of entity 14. For example, device 11 may include a vehicle, an IoT (Internet of things) device of a user, a traffic control device, etc. Sensors (within motion detection/sensor hardware 9) may include, inter alia, GPS sensors, temperature sensors, pressure sensors, infrared sensors, motion sensors, a microphone, optical sensors, a thermal imaging apparatus/sensor, optical and vibrational sensors, voltage sensors, RFID sensors, etc. Memory systems 8 and 20 may each include a single memory system. Alternatively, memory systems 8 and 20 may each include a plurality of memory systems. Network 7 may include any type of network including, inter alia, a local area network, (LAN), a wide area network (WAN), the Internet, a wireless network, etc.

System 100 enables a process with respect to an entity (e.g., entity 14) requiring location verification by a plurality of independent location verifiers (e.g., device 11) broadcasting a request within a localized area to have a current location independently verified. The broadcast request may include information such as, inter alia, a verification request type, an entities self-determined GPS location, an acceptable respondent attribute (e.g., government, business, individual, etc.), monetary/payment exchange information, verification accounting type required, additional information required to enable the verification process to proceed, etc.

The following steps describe a process for establishing a communication and interlock between a requesting entity (e.g., entity 14) and a responder (e.g., device 11) with respect to a location verification request:

The process is initiated when an entity broadcasts a request for providing a location verification. The broadcast may include identification information, current location information, projected location at a given time period, a radius of service need, and recognition heuristics information. Additionally, the broadcast may include:

1. Verification request types currently accepted (e.g., photo, video (with/without object recognition framing) and precision level required (e.g., OCR of license plate/registration numbers, biometric recognition, object recognition, etc.).

2. Acceptable image blur tolerance for the image subject and verification process.

3. Requested responder class preferences (Government municipality, business, individual, etc.).

4. Payment information such as payment offered, conveyance methods, etc.

5. Required method of receiving verification (e.g., provider signed object, blockchain brokerage service, etc.).

In response to the broadcast request, the entity listens for location verification responders. The responders may provide (via a response): a responder identification (i.e., certificate validated through a trusted 3rd party authority, self-identified, anonymous, etc.), a responder location, and responder location verification fulfillment capabilities (e.g., image, video, etc.). Subsequently, the entity accepts or rejects location verification responder based on a provided response from the responder and entity requirements with respect to multiple responders engaged serially or concurrently. The provided response may include a responder verifiable certificate issued through a trusted authority to enable identity verification associated with secure communications. Alternatively, the responder may not be associated with a trusted authority if the requesting entity does not require a trusted authority (e.g., in the event of an emergency, a vehicle accident, etc.) video or images of a scene may be sufficient. Likewise, a responder identity may be traced through a payment trail if required. Upon accepting a location verification request, the entity and responder establish a device to device communication channel (e.g., IoT device to device D2D 5G enabled devices, vehicle based dedicated short-range communications (DSRC), vehicle-based C-V2X communication, etc.). Subsequently, the entity and responder enable a resulting agreement and terms with a binding contract by exchanging an object signing or placing an entry in a mutually agreed blockchain service. Likewise, the responder verifies the entity location by adding the responder's location, relevant metadata, and identity signatures. The verification is transmitted directly (via an established communication channel) and/or is uploaded to the agreed blockchain service. The established communication channel may be configured to enable the responder to: acknowledge entity location capture, request actions of the entity to enable location capture (e.g., move to a specified coordinate), and terminate the agreement if it is unable to capture the entity location. Additionally, the entity may reject provided location proof and request a redo of location verification from the responder. Likewise, the responder may accept or reject a re-engagement process. Additionally, a payment is rendered to the responder upon validated receipt of verification or terms of the agreement (e.g., a validation process may involve an inspection of an image/video for object recognition of the entity).

Figure 2:
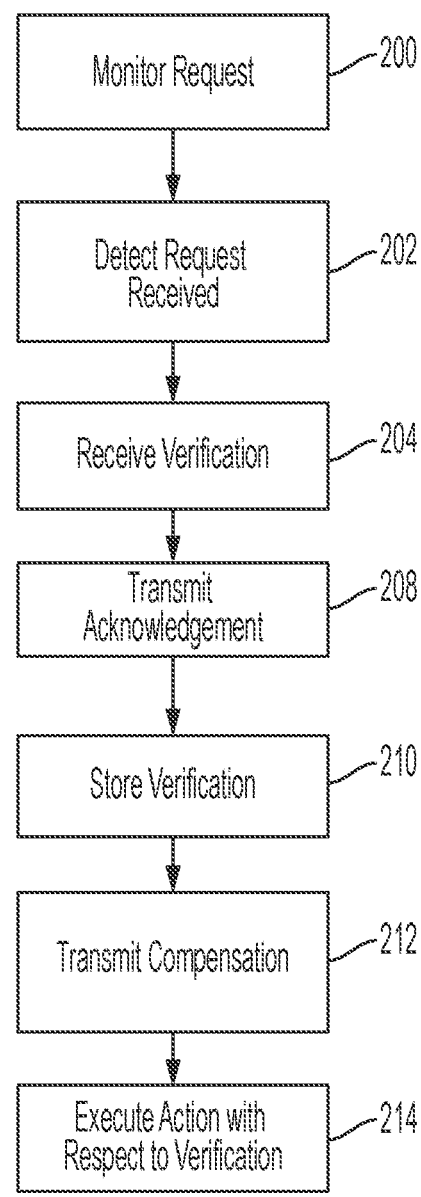
FIG. 2 illustrates an algorithm detailing a process flow enabled by the system of FIG. 1 for improving detection and verification technology by detecting entity locations and acknowledging specified locations and associated timeframes associated with the entity, in accordance with embodiments of the present invention.

FIG. 2 illustrates an algorithm detailing a process flow enabled by system 100 of FIG. 1 for improving detection and verification technology by detecting entity locations and acknowledging specified locations and associated timeframes associated with the entity, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by entity 14 and/or device 11 of FIG. 1. In step 200, a request is broadcast (e.g., via a network, radio frequency (RF) waves, etc.) by an entity for verifying a location of an entity (e.g., a delivery vehicle delivering cargo, a land-based vehicle, a flight-based vehicle, etc.) is monitored by a hardware device (e.g., a server). In step 202, the hardware device detects that request has been received by a responder device located within a specified perimeter surrounding the entity. The responder device may include, an IOT device of a user, a controller in a vehicle, a traffic camera, etc.

In step 204, verification data indicating that the entity has been located at the location during a specified timeframe is received from the responder device. The verification data may include: visual data (e.g., photo data, video data, audio data, object recognition data, biometric recognition data, etc.) representing the entity at the location, audible data verifying the entity at the location, signal-based data (e.g., audio data, light-initiated data, global positioning system (GPS) data, RFID data, infrared data, IOT device signal data, sensor-initiated entity detection data, etc.) verifying the entity at the location, etc. Additionally, the verification data may indicate a radius of service and recognition heuristics data associated with the entity. The verification data may further include identification data, location data, and fulfillment capabilities for the verification device.

In step 208, an acknowledgement indicating that said verification data has been received is transmitted to the responder device. In step 210, the verification data is stored within a database. In step 212, a compensation indication associated with providing the verification data is transmitted to the responder device. In step 214, the verification data is accepted or declined. Additionally, a secure communication channel between the hardware device and the verification device is established.

Figure 3:
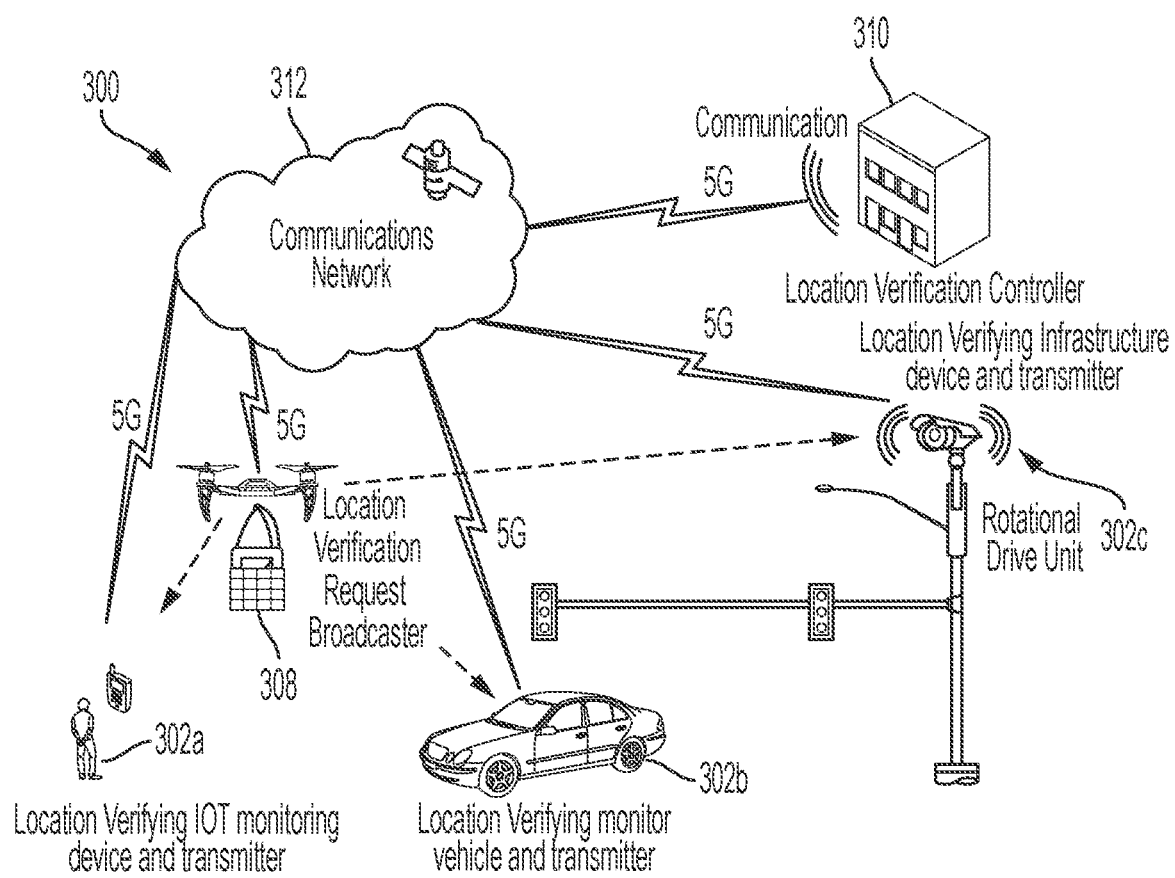
FIG. 3 illustrates an implementation example for improving detection and verification technology, in accordance with embodiments of the present invention.

FIG. 3 illustrates an implementation example implemented by a system 300 for improving detection and verification technology, in accordance with embodiments of the present invention. System 300 includes a vehicle 308 requiring location verification, responding devices 302a . . . 302c, and a location verification controller 310 interconnected through a communications network 312. The verification process is initiated when a requesting party (i.e., via vehicle 308) establishes a request (to a responder party(s) accessing responding devices 302a . . . 302c) for a remote $3^{rd}$ party verification. The requesting party defines a number (quantity) and type (quality) of required verification requests associated with the responder party(s). The responder party(s) determines that a 3rd party verification is required from another entity (i.e., the process is dynamic and iterative for a number of verifications required). Each response to the location verification requests are evaluated and ranked by the requesting party(s) in terms of proximity, trust, and a reliability that the responder party(s) are identified and that their weighted value is associated with fulfilling a location verification requirement (e.g., an armored truck driver carrying a large amount of cash may require a different set of location verification suppliers than a pizza delivery driver from a company with respect to a risk perspective. Subsequently, the requesting party(s) broadcasts a request for a specified number of verifiers to independently verify the requesting party's location and associated timestamp. The request broadcast may be executed via communication protocols including, inter alia, 5G, Bluetooth, BLE, Z-Wave, Wi-Fi, LTE, Dash7, a specialized software application, etc.

The requesting party listens for location verification responses to fulfill their location requests via, inter alia, social based networks, Ad-hoc private networks with issued credentials, decentralized over air networks, broker services, networks, IoT based networks, etc. In response, a location verification provider (via verification controller 310) transmits physical location and credential information to the user requesting the location verification. The physical location and credential information may include visual proof of the requesting party location (e.g., video, photo, thermal signature image mapping, etc.). The requesting party receives the returned acknowledgment receipt with all related information. The requesting party prioritizes the responses, selects verifiers best fitting request needs, acknowledges responses (i.e., decline/accept), generates course adjustments to meet up with verifier if needed, and creates a secure communication channel with a verifier until the transaction is complete. Additionally, telemetry data is continuously transmitted to the verifier until the verifier confirms a current location capture via agreed upon terms such as a photo, a video, a sound signature, etc. The telemetry data enables system 300 to establish social tracking of validation proof (and associated record) associated with verifying that an object or entity was physically present at a defined location during a defined time. The associated (immutable) record is stored within a cloud-based location verification accounting database associated with communications network 312. Likewise, the verifier is assured payment by a broadcaster for services rendered and a payment accounting receipt is issued and recorded within an immutable ledger.

Figure 4:
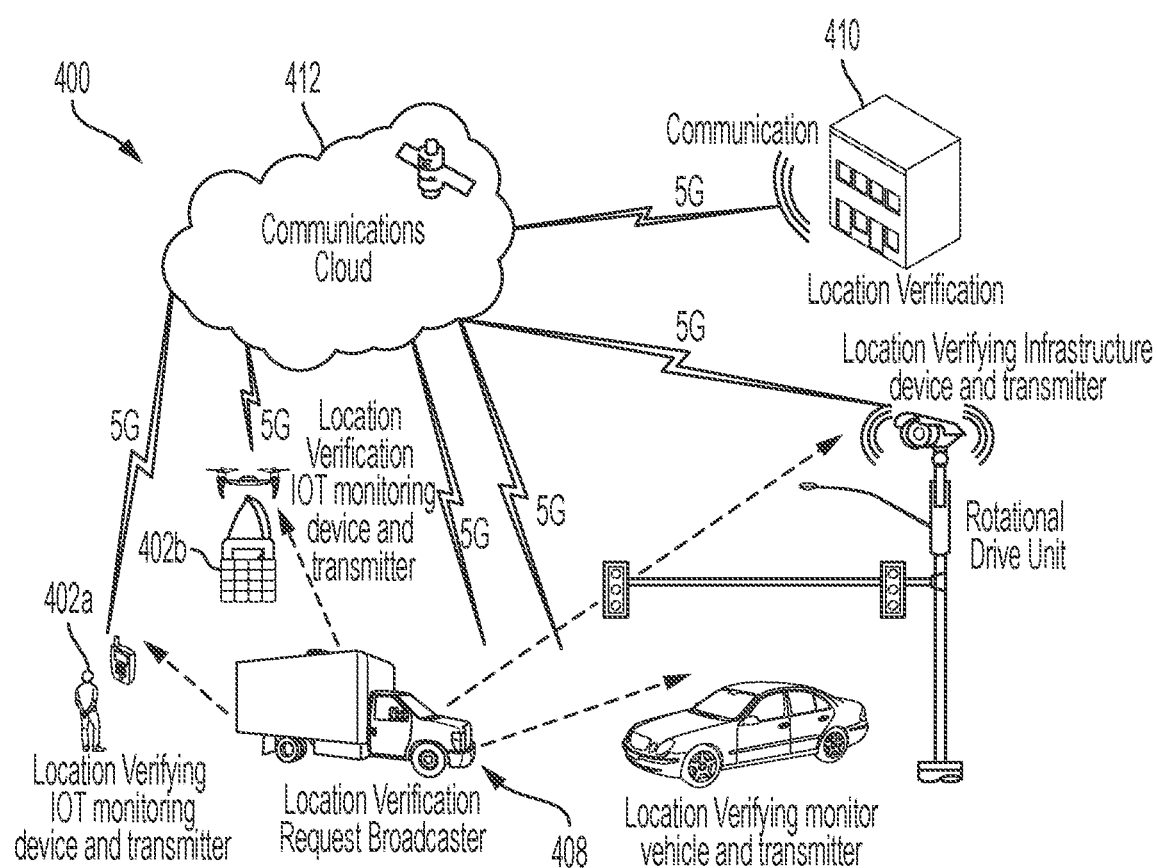
FIG. 4 illustrates an alternative implementation example for improving detection and verification technology, in accordance with embodiments of the present invention.

FIG. 4 illustrates an alternative implementation example with respect to the implementation example of FIG. 3 implemented by a system 400 for improving detection and verification technology, in accordance with embodiments of the present invention. System 400 includes a vehicle 308 requiring location verification, responding devices 402a . . . 402c, and a location verification controller 410 interconnected through a communications network 412. In contrast with system 300 of FIG. 3, system 400 of FIG. 4 includes an armored truck vehicle requiring location verification and a flight-based vehicle 402b (in combination with responding devices 402a and 402c) performing location verification services for a remote $3^{rd}$ party verification as described with respect to FIG. 3, supra.

Figure 5:
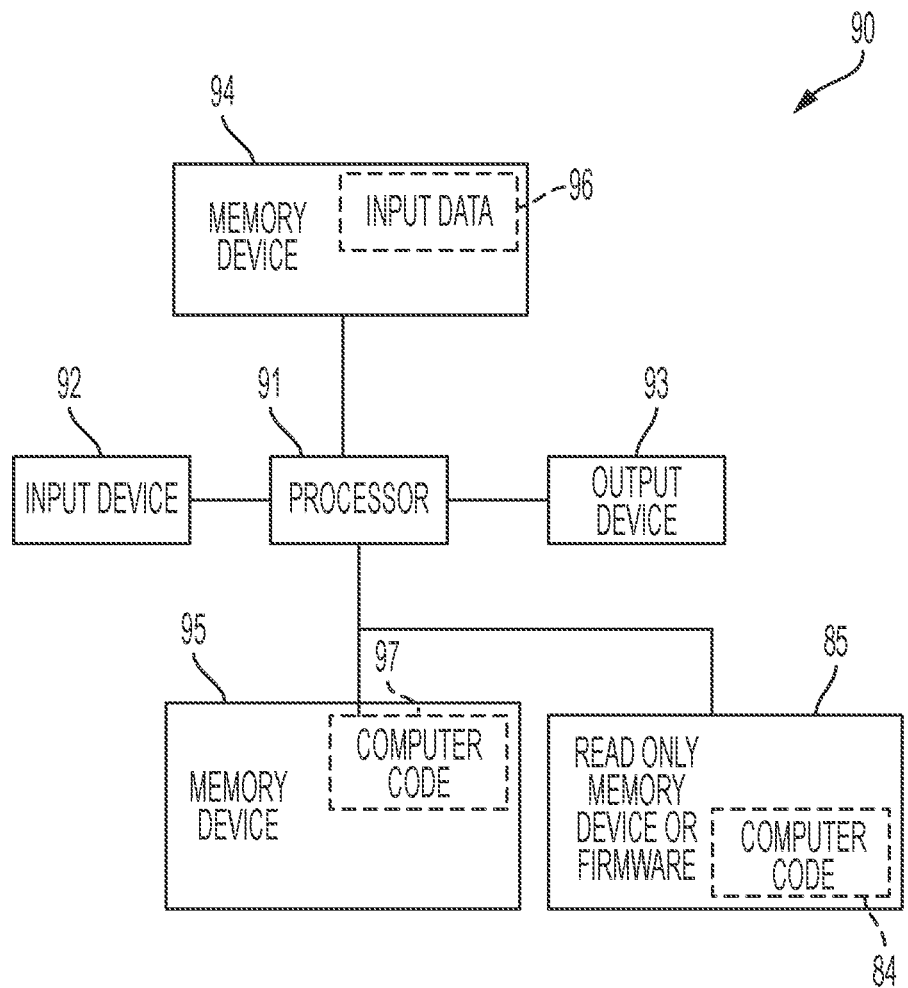
FIG. 5 illustrates a computer system used by the system of FIG. 1 for improving detection and verification technology by detecting entity locations and acknowledging specified locations and associated timeframes associated with the entity, in accordance with embodiments of the present invention.

FIG. 5 illustrates a computer system 90 (e.g., server 21, entity 14, and device 11 of FIG. 1) used by or comprised by the system of FIG. 1 for detecting entity locations and acknowledging specified locations and associated timeframes associated with the entity, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for detecting entity locations and acknowledging specified locations and associated timeframes associated with the entity. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve detection and verification technology by detecting entity locations and acknowledging specified locations and associated timeframes associated with the entity. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for improving detection and verification technology by detecting entity locations and acknowledging specified locations and associated timeframes associated with the entity. In another embodiment, the invention provides a business method that performs the process steps of the invention on a subscription, advertising, and/or fee basis. That is, a service supplier, such as a Solution Integrator, could offer to enable a process for improving detection and verification technology by detecting entity locations and acknowledging specified locations and associated timeframes associated with the entity. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a configuration of hardware and software, any configuration of hardware and software, as would be known to a person of ordinary skill in the art, may be utilized for the purposes stated supra in conjunction with the computer system 90 of FIG. 5. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
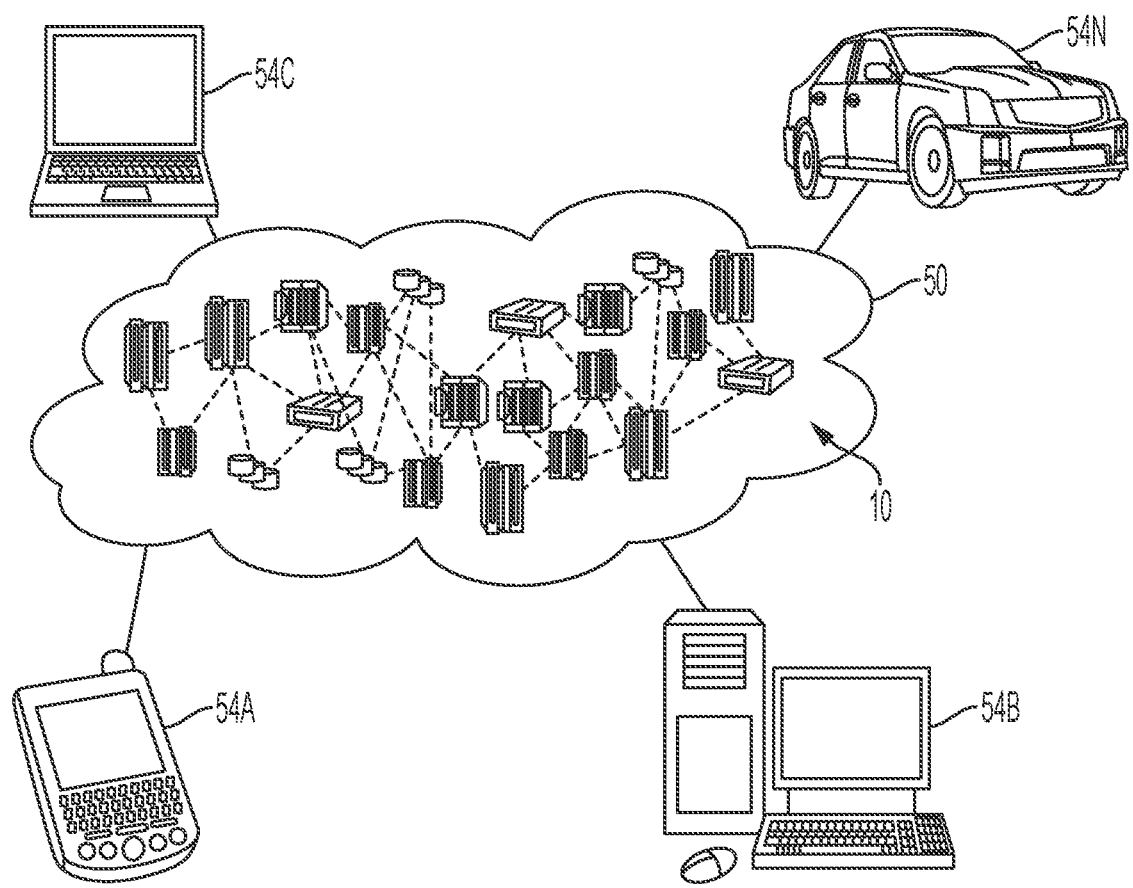
FIG. 6 illustrates a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 7:
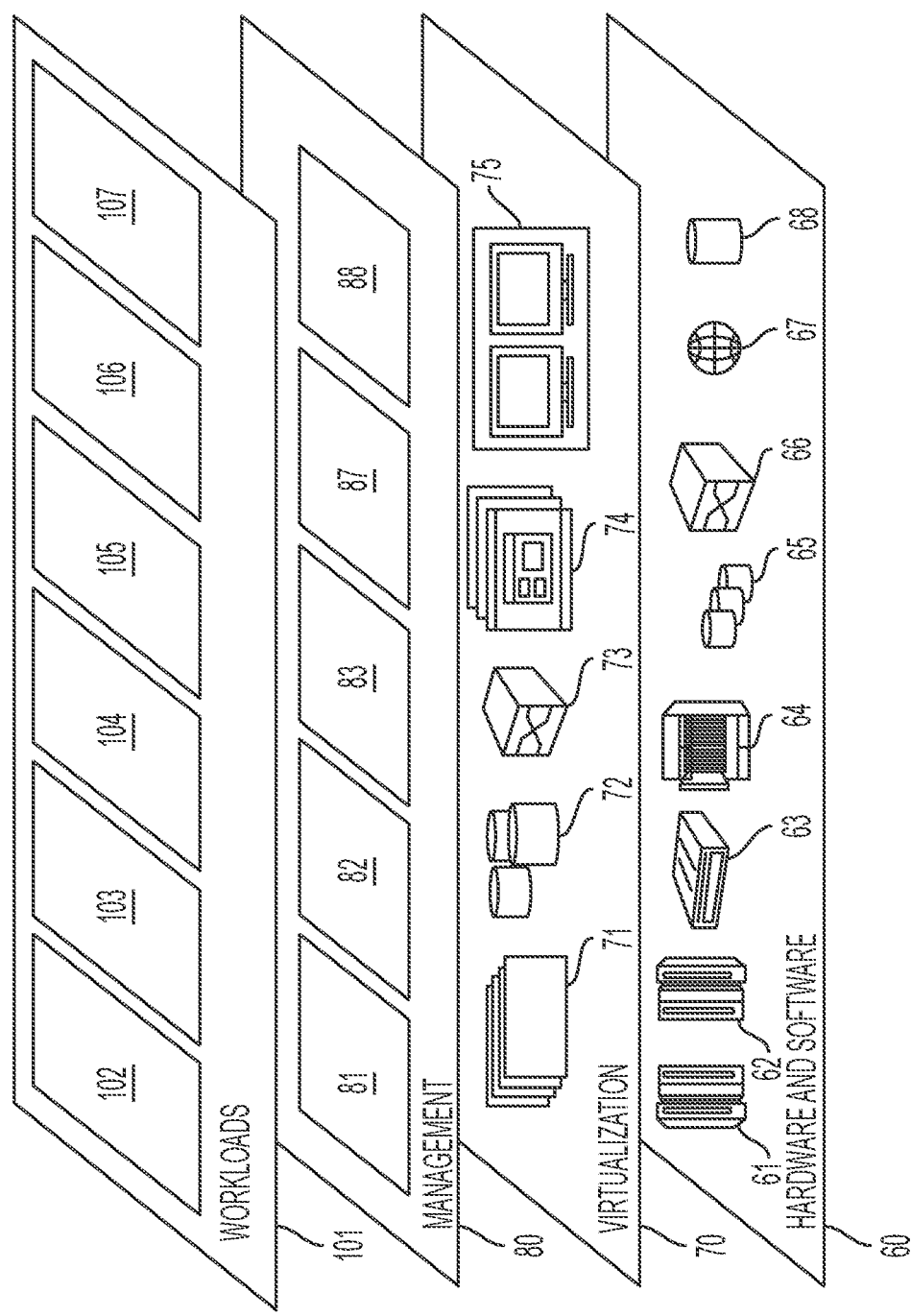
FIG. 7 illustrates a set of functional abstraction layers provided by cloud computing environment, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 104; data analytics processing 105; transaction processing 106; and for improving detection and verification technology by detecting entity locations and acknowledging specified locations and associated timeframes associated with the entity 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An automated verification method comprising:

monitoring, by a computer processor of a hardware device, a request broadcast by an entity for verifying a first location of said entity, wherein said request comprises data defining a number and a type of required verification requests;

detecting, by said processor, that said request has been received by a first device located within a specified perimeter surrounding said entity;

receiving, by said processor from said first device based on said number and said type of required verification requests, verification data indicating that said entity has been located at said first location during a specified timeframe, wherein said verification data comprises an authentication certificate validated by a trusted external authority entity;

transmitting, by said processor to said first device, an acknowledgement indicating that said verification data has been received;

storing within a database, by said processor, said verification data;

detecting, by said processor, that said request has been received by a controller within a vehicle located within said specified perimeter surrounding said entity;

enabling, by said processor, communications between a responding traffic camera on a rotational drive unit and said controller;

receiving, by said processor from said controller based on said number and said type of required verification requests, additional verification data indicating that said entity has been visually detected, via said responding traffic camera, at said first location during said specified timeframe;

transmitting, by said processor to said controller, an additional acknowledgement indicating that said additional verification data has been received;

storing within a database, by said processor, said additional verification data;

evaluating and ranking, by said processor, said first device and said controller with respect to a proximity, trust, and a reliability of responder parties associated with said first device and said controller; and transmitting, by said processor to said first device and said controller, a compensation indication generated in response to results of said evaluating and said ranking with respect to providing said verification data and said additional verification data.

2. The method of claim 1, wherein said verification data comprises visual data representing said entity at said first location.

3. The method of claim 2, wherein said visual data comprises data selected from the group consisting of photo data, video data, audio data, object recognition data, and biometric recognition data.

4. The method of claim 1, wherein said verification data comprises audible data verifying said entity at said first location.

5. The method of claim 1, wherein said verification data comprises signal-based data verifying said entity at said first location.

6. The method of claim 1, wherein said signal-based data comprises data selected from the group consisting of: audio data, light-initiated data, global positioning system (GPS) data, RFID data, infrared data, IOT device signal data, and sensor-initiated entity detection data.

7. The method of claim 1, wherein said first device comprises a device selected from the group consisting of an IOT device of a user, a controller in a vehicle, and a traffic camera.

8. The method of claim 1, wherein said entity comprises a vehicle selected from the group consisting of flight-based vehicle and a land-based vehicle.

9. The method of claim 1, wherein said entity comprises a person requiring location verification.

10. The method of claim 1, wherein said request is broadcast via a network connection.

11. The method of claim 1, wherein said request is broadcast via RF waves.

12. The method of claim 1, wherein said entity comprises a delivery vehicle delivering cargo to said first location, and wherein said verification data indicates that said entity has delivered said cargo to said first location.

13. The method of claim 1, wherein said verification data further indicates a radius of service and recognition heuristics data associated with said entity.

14. The method of claim 1, wherein said verification data further comprises identification data, location data, and fulfillment capabilities for said first device.

15. The method of claim 1, further comprising:
accepting, by said processor, said verification data.

16. The method of claim 15, further comprising:
establishing, by said processor, a secure communication channel between said hardware device and said first device.

17. The method of claim 1, further comprising:
declining, by said processor, said verification data.

18. The method of claim 1, further comprising:
providing at least one support service for at least one of creating, integrating, hosting, maintaining, and deploying computer-readable code in the control hardware, said code being executed by the computer processor to implement: said monitoring, said detecting, said receiving, said transmitting said acknowledgement, said storing, and said transmitting said compensation.

19. A computer program product, comprising a computer readable hardware storage device storing a computer readable program code, said computer readable program code comprising an algorithm that when executed by a computer processor of a hardware device implements an automated verification method, said method comprising:

monitoring, by said computer processor, a request broadcast by an entity for verifying a first location of said entity, wherein said request comprises data defining a number and a type of required verification requests;

detecting, by said processor, that said request has been received by a first device located within a specified perimeter surrounding said entity;

receiving, by said processor from said first device based on said number and said type of required verification requests, verification data indicating that said entity has been located at said first location during a specified timeframe, wherein said verification data comprises an authentication certificate validated by a trusted external authority entity;

transmitting, by said processor to said first device, an acknowledgement indicating that said verification data has been received;

storing within a database, by said processor, said verification data;

detecting, by said processor, that said request has been received by a controller within a vehicle located within said specified perimeter surrounding said entity;

enabling, by said processor, communications between a responding traffic camera on a rotational drive unit and said controller;
receiving, by said processor from said controller based on said number and said type of required verification requests, additional verification data indicating that said entity has been visually detected, via said responding traffic camera, at said first location during said specified timeframe;
transmitting, by said processor to said controller, an additional acknowledgement indicating that said additional verification data has been received;
storing within a database, by said processor, said additional verification data;
evaluating and ranking, by said processor, said first device and said controller with respect to a proximity, trust, and a reliability of responder parties associated with said first device and said controller; and
transmitting, by said processor to said first device and said controller, a compensation indication generated in response to results of said evaluating and said ranking with respect to providing said verification data and said additional verification data.

20. A hardware device comprising a computer processor coupled to a computer-readable memory unit, said memory unit comprising instructions that when executed by the computer processor executes an automated verification method comprising:
monitoring, by said computer processor, a request broadcast by an entity for verifying a first location of said entity, wherein said request comprises data defining a number and a type of required verification requests;
detecting, by said processor, that said request has been received by a first device located within a specified perimeter surrounding said entity;
receiving, by said processor from said first device based on said number and said type of required verification requests, verification data indicating that said entity has been located at said first location during a specified timeframe, wherein said verification data comprises an authentication certificate validated by a trusted external authority entity;
transmitting, by said processor to said first device, an acknowledgement indicating that said verification data has been received;
storing within a database, by said processor, said verification data;
detecting, by said processor, that said request has been received by a controller within a vehicle located within said specified perimeter surrounding said entity;
enabling, by said processor, communications between a responding traffic camera on a rotational drive unit and said controller;
receiving, by said processor from said controller based on said number and said type of required verification requests, additional verification data indicating that said entity has been visually detected, via said responding traffic camera, at said first location during said specified timeframe;
transmitting, by said processor to said controller, an additional acknowledgement indicating that said additional verification data has been received;
storing within a database, by said processor, said additional verification data;
evaluating and ranking, by said processor, said first device and said controller with respect to a proximity, trust, and a reliability of responder parties associated with said first device and said controller; and
transmitting, by said processor to said first device and said controller, a compensation indication generated in response to results of said evaluating and said ranking with respect to providing said verification data and said additional verification data.

* * * * *